(No Model.)  3 Sheets—Sheet 1.
J. EMERSON.
POWER SCALE FOR SHAFTING.
No. 266,120. Patented Oct. 17, 1882.
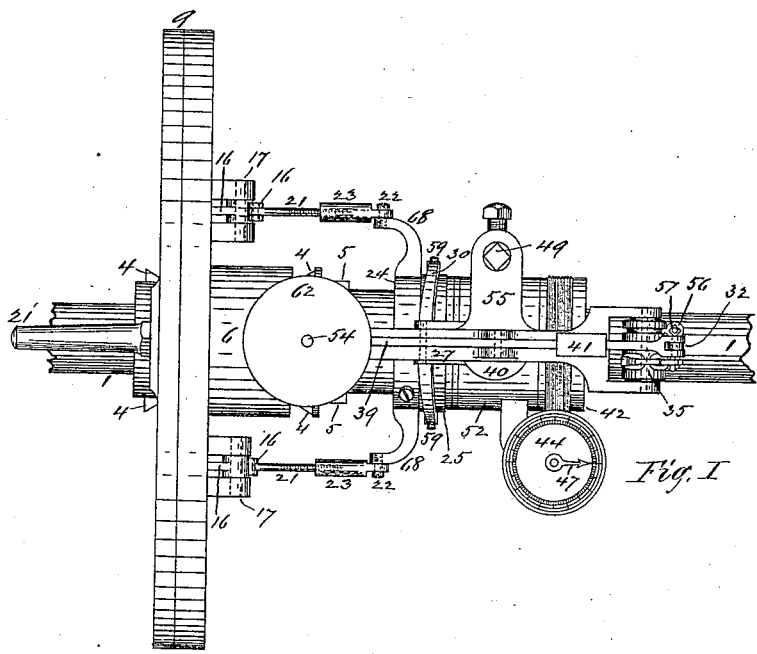
Fig. I
Witnesses.
N. E. Dinnell
Chas H. Wood
Inventor.
James Emerson,
By T. A. Curtis.
his atty.

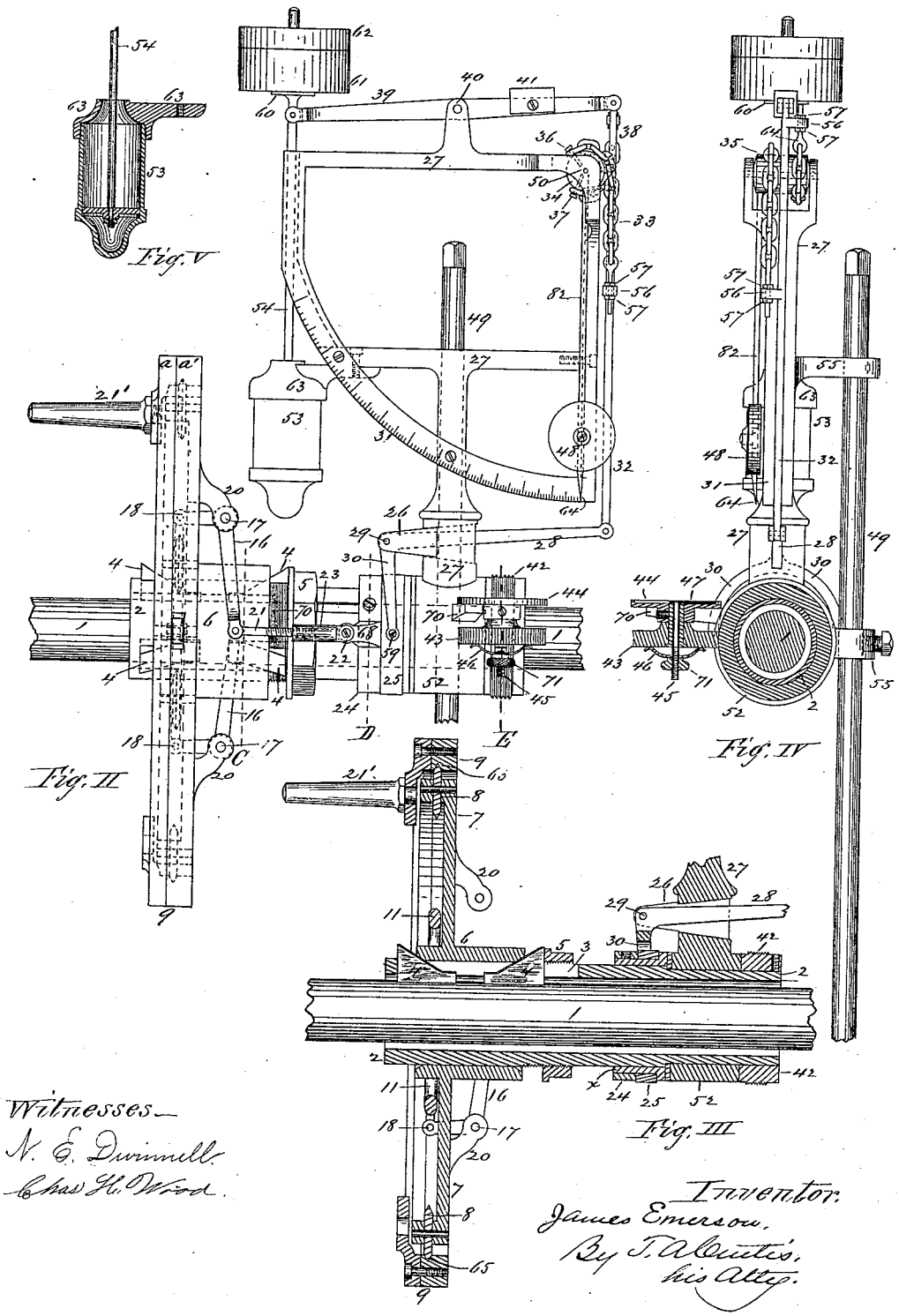

(No Model.) 3 Sheets—Sheet 3.
J. EMERSON.
POWER SCALE FOR SHAFTING.
No. 266,120. Patented Oct. 17, 1882.
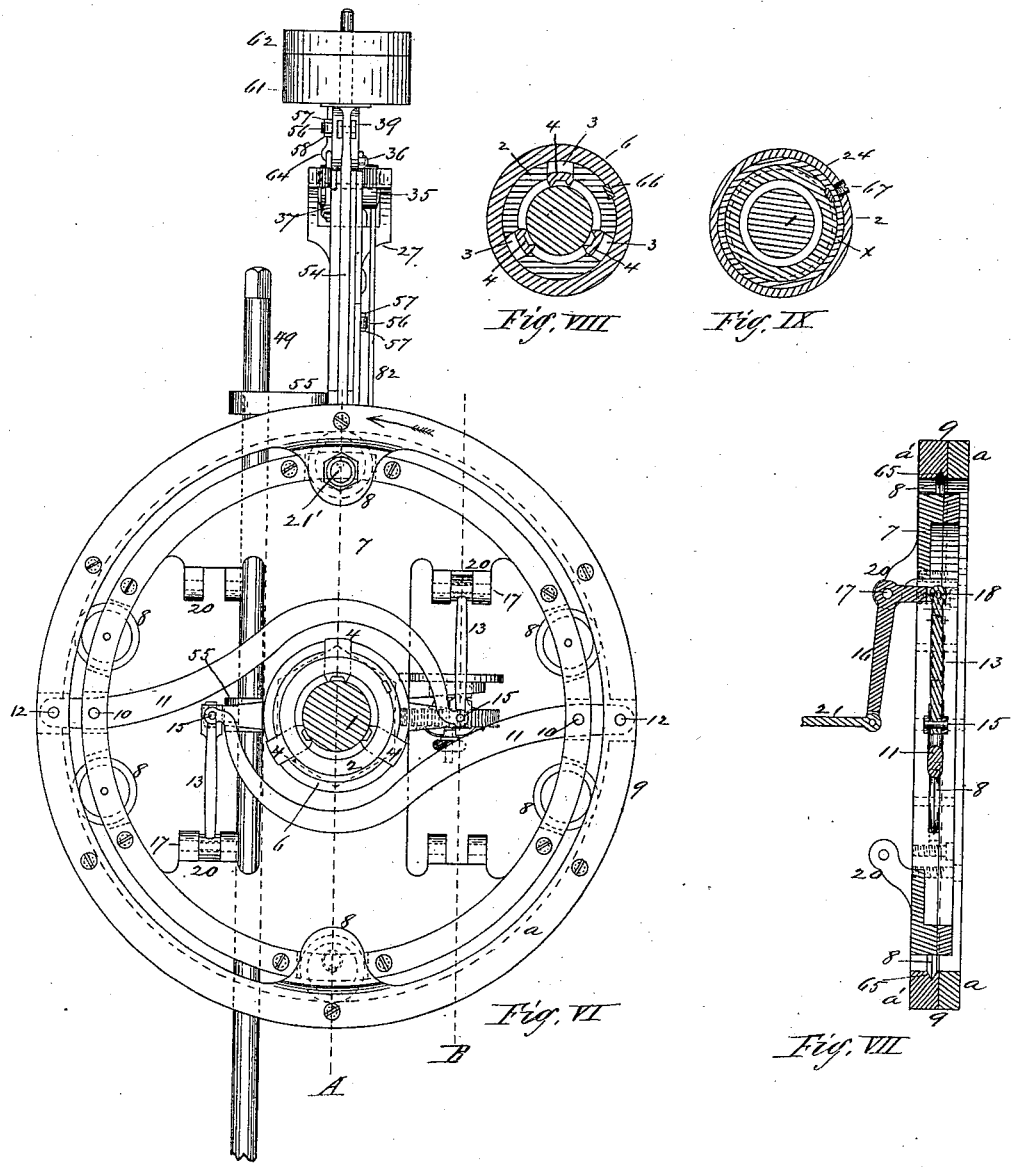

UNITED STATES PATENT OFFICE.

JAMES EMERSON, OF WILLIMANSETT, ASSIGNOR OF ONE-HALF TO WILLIAM A. CHACE, OF HOLYOKE, MASSACHUSETTS.

POWER-SCALE FOR SHAFTING.

SPECIFICATION forming part of Letters Patent No. 266,120, dated October 17, 1882.

Application filed July 17, 1882. (No model.)

*To all whom it may concern:*

Be it known that I, JAMES EMERSON, of Willimansett, in the county of Hampden and State of Massachusetts, have invented a new and useful Improvement in Dynamometers or Power-Scales, of which the following is a specification and description.

The object of my invention is to provide an instrument for weighing the power required to drive machinery, which is adapted to be attached to the shaft of any machine and to engage with the pulley which drives said machine, whereby when the instrument is so attached the amount of power required to drive the machine to which it is attached is readily and accurately indicated or weighed; and I accomplish this by the mechanism, substantially as hereinafter described, and illustrated in the accompanying drawings, in which—

Figure I is a plan view of my invention. Fig. II is a side view of the same. Fig. III is a longitudinal vertical section of that portion of the device which surrounds the shaft of the machine, to which it may be secured at line A of Fig. VI. Fig. IV is a transverse section through the tubular shaft and indicator, which indicates the number of revolutions of the shaft, to which the instrument is attached at line E of Fig. II. Fig. V is a longitudinal section of the dash-pot at the axis of its piston-rod. Fig. VI is an end view of the instrument, looking toward the outer face of the circular frame which supports the prime levers. Fig. VII is a vertical section of the circular frame which supports the prime levers, and of its encircling ring, to which the power is applied at line B of Fig. VI. Fig. VIII is a transverse section of the tubular shaft and the hub of the circular frame at line C of Fig. II, showing the two secured together and both secured to a shaft; and Fig. IX is a transverse section at line D of Fig. II, showing the sliding collar, which is connected with and which actuates the scale-beams and moves the pendent indicating-arm along the scale.

In the drawings, let 1 represent the shaft of any machine to which it is desired to secure the instrument for the purpose of ascertaining the amount of force that is exerted by the driving-belt to drive the machine in causing the machine to perform the work required.

2 represents a tube, in which I make three longitudinal openings, as 3, at equal distances apart around the tube, and the latter being placed upon a shaft of the same or of less diameter than the interior of the tube, I insert a key, as 4, into one end of each opening, with the inclined edge of the key outward and its widest end against the end of the opening, and I then insert the tube into the hub, as 6, of the circular frame, as 7, with the end of the hub bearing against the inclined edges of the keys. I then insert another key into the opposite end of each opening, as 3, with their inclined edges toward the hub 6, and I then turn a nut, as 5, onto the threaded part, as 70, of the tube and firmly against the wider ends of the keys, as 4, which were last inserted, and force the latter into and against the interior of the hub, as 6, and the circular frame, as 7, is then firmly secured to the shaft, and also to the tube, and in a position concentric to both. A collar, as $x$, is fitted to the tube, so as to slide freely to and fro thereon, and is secured thereto, as by an ordinary spline and key, as shown in Fig. IX, so as to revolve with the tube, and to the outside of this collar is fitted another collar, as 25, so that the sliding collar, as $x$, may revolve freely within the collar 25, and another collar, as 24, is fitted to the outside of the sliding collar $x$, and to which it is fixed by a set-screw, so as to revolve therewith; and to this collar, as 24, or to arms, as 68, made thereon, are pivoted two swivels, as 23, provided with interior screw-threads, into each of which is turned a threaded rod, as 21.

The outer circular portion of the frame, as 7, I make preferably in two parts in the direction of its thickness, for convenience of construction, and in this outer circular portion are pivoted any desired number of friction-rolls, as 8, whose edges I make preferably of V shape, and these rolls are so pivoted in the frame that their extreme outer portions are concentric with the axis of the frame or with the shaft extending through its hub. A circular ring, as 9, preferably made in two parts, as $a$ and $a'$, in the direction of its thickness, for convenience of construction, encircles the circular frame 7, and this ring is provided with an internal groove, as 65, made of a V shape in its cross-section, and when in place the peripheries of all the friction-rolls, as 8, have a bearing in the internal groove, 65, made in the ring 9, so that the latter will move freely on said rolls in the direction of its plane. Two prime levers, as 11, are pivoted in the rim or circular portion of the frame 7, as at 10, one opposite the other, and the short arm of each prime lever projects through the circular portion of the frame, and is pivoted at the end in the ring, as 9, at 12, and each lever may be curved to extend partially around the hub 6 of the frame, and its end may be pivoted to the end of a bar, as 13. The other end of each bar 13 is pivoted at 18 to the short arm of a bell-crank lever, as 16, which is hung upon a pivot, as at 17, to the ear, as 20, made on the frame, as 7. The end of the long arm of each crank-lever, as 16, is pivoted to one end of a short screw-rod, as 21, made to turn into the threaded swivel, as 23, each of which is pivoted to an ear, as 68, made on the collar, as 24.

A collar, as 42, is secured to the tube, as 2, so as to revolve therewith, which collar has an external screw-thread made thereon, as shown in Figs. II and III; and another collar, as 52, is fitted to the tube 2, so that the latter may revolve freely therein, and upon this collar is made a frame, as 27, extending upward therefrom. A lever, as 28, is pivoted to this frame or to two ears projecting therefrom, as at 29, the short arm of this lever being forked, as at 30, and, extending at right angles to the long arm, is pivoted, as at 59, to opposite sides of the collar or ring, as 25, and the long arm of this lever is jointed to the lower end of a vertical rod, as 32, to which is adjustably attached one end of a chain, as 33, whose upper end extends over and partially around a roll, as 34, and is secured thereto, as at 36. Another chain, as 38, extends beneath and partially around the same roll and is secured thereto, as at 37, and extends up and is adjustably secured to one end of the scale-beam, as 39, pivoted, as at 40, to the frame 27, and the upper end of this scale-beam is jointed to a vertical rod, as 54, upon the upper part of which I make a horizontal disk or flange, as at 60, and upon the lower end of this rod I make a piston or plunger, which properly fits within the cylinder, as 53, which I prefer to screw into its cover, as 63, the latter being properly secured firmly to the frame, as 27. This cylinder, together with its piston, serves the purpose of a dash-pot, and, being filled with oil or other suitable liquid, serves as a cushion to obviate any sudden and violent movement of the apparatus, caused by any sudden changes or variations in the power or in the work being done by the machine to which the instrument is attached, and any desired number of weights, as 62, may be placed upon this disk or flange 60, if desired, in the operation of testing or weighing the power used by any machine.

The roll, as 34, to which the chains, as 33 and 38, are attached, as hereinbefore described, is pivoted in the frame, as at 50, and to this roll is securely fixed a pendent arm, as 82, with a weight, as 48, adjusted near its lower end; and a portion of the frame is made of a circular form, upon a radius of which the pivot of the roll, as 34, is the center, with a graduated scale, as 31, made thereon, so that as the roll 34 is moved on its pivot the lower pointed end of the pendent arm 82 may move along said scale.

The vertical rod, as 32, the roll, as 34, and the beam, as 39, should be connected by the chains, as 33 and 38, in such manner that there may be no lost motion of the roll when actuated by the chains; and I accomplish this preferably by an ear, as 56, made on the vertical rod, as 32, and a screw-rod on the end of the chain 33, extending through this ear, with a check-nut, as 57, on the screw-rod above the ear, and another nut below the ear, and a similar fastening above the roll to connect the chain 38 with the beam, as 39. By this mechanism the rod 32, roll 34, and beam 39 may be connected with such nicety of adjustment that the slightest movement of the lever, as 28, will be indicated by a corresponding relative movement of the lower end of the indicator or pendent arm, as 82, along the scale 31 into a more or less inclined position.

A piece, as 70, projecting from the stationary collar 52, supports a stationary dial, as 44, having a circular graduated scale marked thereon, through which extends a spindle, as 45, with a worm-gear wheel, as 43, placed upon said spindle below the dial; and the lower end of the spindle is provided with a screw-thread, with a clamp-spring, as 46, placed on the spindle below the worm-gear wheel, and a thumb-nut, as 71, turned on the lower threaded end of the spindle and against the clamp-spring 46 to cause the latter to bear upward against the worm-gear wheel with the desired pressure. A pointer or index, as 47, is secured to the upper end of the spindle above the dial, and when the shaft and the collar 42 are revolved the exterior screw-thread on said collar engaging with the teeth on the periphery of the wheel 43, the latter, together with the spindle 45, clamped thereto by the spring 46, and the index secured to said spindle, are revolved also, the index revolving in a plane parallel with the upper side of the dial, the latter having a graduated scale marked thereon; but if the index and spindle 45 be held stationary, by holding the index with the fingers while the shaft 1 is being revolved the worm-gear wheel, as 43, will continue its movement, while the index remains stationary. If the exterior screw-thread on the collar 42 is made with the desired number to the inch the circular scale on the upper face of the dial, as 44, may be graduated to indicate any given number of revolutions of the shaft, as 1, to a single revolution of the index or pointer, as 47, around the face of the dial.

The circular frame, as 7, which revolves with the shaft is for convenience provided with four places or ears, as 20, in which to pivot the bell-crank levers, as 16, inasmuch as the actuating shafts and pulleys of some machines revolve in the opposite direction from others, and when the instrument is used to measure the power of a machine whose actuating shaft and pulley revolve in a direction indicated by the arrow in Fig. VI, the prime levers, as 11, are pivoted in the revolving circular frame and its ring, as 9, as shown in black lines in that figure; but if the actuating shaft and pulley revolved in the opposite direction, the prime levers, as 11, would be pivoted in the revolving frame 7 and ring 9 in a reversed position, and the bell-crank levers 16 would be pivoted at points 20 opposite to those in which they are shown as pivoted in the drawings.

One or more ears, as 55, are made to project outward from the stationary frame, as 27, having a vertical hole through which a rod, as 49, pointed at its lower end, is inserted, with a set-screw turned through the ear, so that when the instrument is attached to a machine the pointed rod may be placed in a vertical position and driven slightly into the floor and the set-screw turned in against the rod to form a firm support for the outer end of the tubular shaft or sleeve, as 2, and by which means the frame and its pendent rod, as 82, will be held stationary in a vertical position.

Inasmuch as the tube, as 2, serves the purpose of a shaft, upon which are secured all the different parts of the instrument, I prefer to denominate this tube a "tubular shaft" or "sleeve."

To use this instrument the ordinary loose pulley of the machine to which it is to be attached is removed, and the fixed pulley is loosened by removing its key or turning out its set-screw, so that the pulley may run loose on the shaft, and the instrument, together with its tubular shaft, is slipped onto the shaft of the machine and secured in the same position from which the loose pulley was removed by means of the keys, as 4, and nut, as 5, in the same manner as the instrument is secured to the shaft, as 1, in the drawings, and with the rod, as 49, secured in the stationary frame, as 27, by the set-screw, and its pointed end in the floor, as before mentioned, with the revolving frame, as 7, and its encircling-ring, as 9, in close proximity to the loosened pulley, so that the arms of the latter as it revolves may engage with the arms, as 21', which project from the side of the ring 9. While using the instrument as thus secured to the machine-shaft the loosened pulley is driven by the ordinary belt which usually drives the machine, so that none of the driving-power is absorbed by the instrument itself while being used.

It is evident that some of the minor details in the construction of the instrument might be varied somewhat without departing in the least from the invention and the principle of its operation. For example, instead of making the sliding collar which slides to and fro on the tubular shaft to operate the lever, as 28, in three parts—namely, the inner collar, as $x$, and an outer collar, as 24, secured thereto, both which slide upon and revolve with the tubular shaft, and the other outer collar, as 25, which also slides with but does not revolve with the other two collars—a single collar may be provided to slide upon and revolve with the tubular shaft, and this collar be provided with an external groove around it, and the pivots, as 59, project through the short arm of the lever, as 28, into this groove, by which construction the said lever 28 would be actuated in precisely the same manner.

To ascertain the number of revolutions per minute of the driving-shaft to which the instrument is attached a watch may be held in one hand and the index or pointer, as 47, on the dial 44 held at the zero-point on the scale of the dial, and when the hand of the watch reaches any desired figure on its face the index 47 is released and allowed to move around the dial, say, for one minute, and when this time has expired the pressure of the finger upon the index 47 will stop it instantly, and by noting the distance the index has passed around the dial during that time the number of revolutions of the shaft will be readily seen.

The prime levers and their connections with the scale-beam and pendent arm should be of such dimensions or of such relations to each other that a pound or any certain number of pounds of power applied at the arm 21 or to the ring 9 shall be indicated at the scale, and any variation from any certain or fixed dimensions may be corrected by adjusting the counterpoise on the scale-beam, or by adjusting the weight either up or down on the pendent arm. The points where the prime levers are pivoted in the ring encircling the revolving frame describe a circle of a given number of feet at each revolution of the shaft and revolving frame.

To compute the amount of power required to drive any machine, as indicated by the instrument, suppose the distance around the above-mentioned circle to be ten feet at each revolution of the shaft, and the latter to be making a certain number of revolutions per minute, as indicated by the pointer on the dial, and the belt to be carrying a certain number of pounds, as indicated by the scale and pendent weight, multiply the number of revolutions per minute by the distance of each revolution, and this product by the number of pounds indicated by the instrument and divide the result by 33,000, the number of pounds raised one foot per minute by any force, and the quotient will be the amount of horse-power required to drive the machine to which the instrument is attached.

The scale-beam, as 39, and the frame, as 27, are placed above the tubular shaft, as 2, to adapt the instrument to be attached to machines whose shafts extend parallel with and in the vicinage of the floor, as the instrument, as herein described, is designed for a portable instrument to be carried from place to place, and to be attached to different machines of any character to ascertain the amount of power required to drive them.

Having thus described my invention, what I claim as new is—

1. The combination, in a power-scale, of a frame adapted to be secured to a shaft and to revolve therewith, prime levers having their fulcrums in said frame, and a ring connected with said frame and having its bearing upon rolls secured therein, and in which the short arms of said prime levers are pivoted, and provided with a projecting arm to engage with the pulley of the machine to which the instrument is attached, substantially as described.

2. In a power-scale, the combination of a tubular shaft or sleeve having longitudinal openings, and having fitted thereto a revolving frame, a sliding collar, a stationary frame supporting a scale-beam and pendent arm, and inclined or wedge-shaped keys adapted to be inserted through said openings, and a nut to be turned against said keys, whereby all the working parts are supported in place on said tubular shaft and secured to said permanent shaft, substantially as described.

3. The combination, in a power-scale, of a tubular shaft or sleeve provided with longitudinal openings, a frame fitted to said tubular shaft or sleeve which supports the fulcrums of prime levers and adapted to be secured to a permanent shaft by keys inserted into said openings, a ring connected with said frame and provided with a side projecting arm to engage with the arms of a driving-pulley and supporting the short arms of said prime levers, bell-crank levers pivoted in said frame, one arm of which is connected with the long arm of said prime levers and the other arm with a collar adapted to slide to and fro on said tubular shaft or sleeve to actuate a scale-beam and pendent arm supported in a stationary frame, substantially as described.

4. The combination, in a power-scale, of a tubular shaft or sleeve having longitudinal openings, a revolving frame fitted thereto and adapted to be secured to a permanent shaft by wedge-shaped or inclined keys inserted into said openings and supporting a ring adapted to engage with and be actuated by a driving-pulley, prime levers having their fulcrums in said frame and with their short arms pivoted in said ring, a collar fitted to and adapted to slide on said tubular shaft or sleeve and actuated by said prime levers through the medium of bell-crank levers pivoted in said revolving frame, and a scale-beam having its fulcrum in a stationary frame supported on said sleeve, an actuating-lever pivoted in said stationary frame connected with the sliding collar, and a pendent arm connected with said actuating-lever and with said scale-beam, substantially as described.

5. The combination, in a power-scale, of the tubular shaft having a collar provided with a worm or screw secured thereto, a stationary dial, a worm-gear engaging with and revolved by said worm or screw, a spindle extending through said dial and worm-gear and carrying an index or pointer on one end outside the dial, and a clamp-spring on the other end, which is held against the worm-gear by a shoulder or pressure-nut, whereby said spindle and pointer are caused to revolve with said worm-gear, and whereby the pointer may be held stationary while the worm-gear is revolving, substantially as described.

6. The combination, in an improved power-scale, of a stationary frame secured upon and supported by a tubular shaft or sleeve and provided with a graduated scale, a scale-beam having its fulcrum in said frame, an actuating-lever having its fulcrum in said frame and connected at one arm with a sliding collar on said sleeve, a pendent arm pivoted or suspended in said frame and connected with one arm of the scale-beam, and also with one arm of said actuating-lever, whereby said pendent arm and said scale-beam are moved on their fulcrums or pivots by said actuating-lever, substantially as described.

7. The combination, in a power-scale, of a stationary frame fitted to a tubular shaft or sleeve and supporting a scale beam, and pendent arm pivoted in said frame, and a removable pointed rod to be secured in said frame by a set-screw, whereby when said rod is driven into the floor and secured in the frame the pendent arm may be held in its proper vertical position, substantially as described.

JAMES EMERSON.

Witnesses:
T. A. CURTIS,
E. E. CURTIS.